US009052215B2

(12) United States Patent
Choi et al.

(10) Patent No.: US 9,052,215 B2
(45) Date of Patent: Jun. 9, 2015

(54) APPARATUS AND METHOD FOR NAVIGATION CONTROL

(71) Applicant: HYUNDAI MOTOR COMPANY, Seoul (KR)

(72) Inventors: Tae Sung Choi, Sacheon-si (KR); Young Chul Oh, Seongnam-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/105,121

(22) Filed: Dec. 12, 2013

(65) Prior Publication Data

US 2015/0046084 A1 Feb. 12, 2015

(30) Foreign Application Priority Data

Aug. 6, 2013 (KR) .......................... 10-2013-0092944

(51) Int. Cl.
*G01C 21/36* (2006.01)
(52) U.S. Cl.
CPC .................................. *G01C 21/3697* (2013.01)
(58) Field of Classification Search
CPC .......... G01C 21/26; G01C 21/20; G08G 1/20; G01S 19/35; B60R 25/33
USPC ........................................................ 701/468
See application file for complete search history.

(56) References Cited

U.S. PATENT DOCUMENTS

2001/0018384 A1   8/2001   Onimaru et al.
2008/0015743 A1*  1/2008   Haug .................................. 701/1

FOREIGN PATENT DOCUMENTS

JP      2001-233196 A      8/2001
KR      10-2012-0069279 A  6/2012
KR      10201200689279   *  6/2012
KR      10-2013-0000125 A  1/2013
KR      10-1255333 B1      4/2013

* cited by examiner

*Primary Examiner* — Maceeh Anwari
(74) *Attorney, Agent, or Firm* — McDermott Will & Emery LLP

(57) ABSTRACT

An apparatus for navigation control includes: a GPS configured to locate a current position of a vehicle and a speed bump ahead of the vehicle; a sensor configured to acquire detailed information of the speed bump and a current speed of the vehicle; a controller configured to locate the current position of the vehicle to divide a distance from the current position to the speed bump into one or more regions, to check the current speed of the vehicle, to calculate a recommended speed for passing over the speed bump based on the detailed information of the speed bump, and to generate a warning message if the current speed is above the recommended speed; and an outputter configured to output the warning message under control of the controller.

12 Claims, 4 Drawing Sheets

APPARATUS AND METHOD FOR NAVIGATION CONTROL

CROSS-REFERENCE TO RELATED APPLICATION

This application is based on and claims priority of Korean Patent Application No. 10-2013-0092944, filed on Aug. 6, 2013 in the Korean Intellectual Property Office, the disclosure of which is incorporated herein in its entirety by reference.

BACKGROUND OF THE DISCLOSURE

1. Field of the Disclosure

The present disclosure relates to an apparatus and a method for navigation control, and more particularly, to an apparatus and a method for navigation control capable of preventing damage to a vehicle and injury to a passenger, by detecting a speed bump in advance whereby a warning of the speed bump and a safety speed can be provided to a driver.

2. Description of the Related Art

In general, speed bumps are located on roads around schools, alleys and the like. Although speed bumps have a standard design specification of 3.6 m in length and 10 cm in height, some speed bumps are made according to a more strict criteria than the standard design specification, while others have no step but are merely painted on roads to prevent accidents due to speeding.

Existing navigation devices only inform a driver that an upcoming speed bump exists in the traveling direction of the vehicle, but do not provide any warning or safety speed even if the vehicle passes over the speed bump at an excessively high speed. Accordingly, damage to the vehicle or an injury to a passenger may occur.

SUMMARY OF THE DISCLOSURE

Accordingly, the present disclosure has been made to solve the above-mentioned problems occurring in the related art while advantages thereof can be maintained intact.

One object of the present disclosure is to provide an apparatus and a method for navigation control for notifying a driver of the presence of a speed bump and providing a safety speed for safely passing over the speed bump.

In one aspect of the present disclosure, there is provided an apparatus for navigation control, the apparatus including: a GPS configured to locate a current position of a vehicle and a speed bump ahead of the vehicle; a sensor configured to acquire detailed information of the speed bump and a current speed of the vehicle; a controller configured to locate the current position of the vehicle to divide a distance from the current position to the speed bump into one or more regions, to check the current speed of the vehicle, to calculate a recommended speed for passing over the speed bump based on the detailed information of the speed bump, and to generate a warning message if the current speed is above the recommended speed; and an outputter configured to output the warning message under control of the controller.

The controller may calculate the recommended speed for each of the one or more regions.

The controller may determine whether the speed bump is a dummy speed bump by checking the detailed information of the speed bump.

If the speed bump is a dummy speed bump, the is controller may generate a message to indicate that the speed bump is a dummy speed bump and may provide the message to the outputter.

The sensor may check the detailed information containing a curvature, a height, and a width of the speed bump, to provide the controller with the detailed information.

The controller may check information of the vehicle containing a type and weight of the vehicle.

In another aspect of the present disclosure, there is provided a method for navigation control, the method including: locating, by a controller, a speed bump ahead of a vehicle based on a signal received from a GPS; checking detailed information of the speed bump based on a signal received from a sensor; locating a current position of the vehicle to divide a distance from the current position to the speed bump into one or more regions; checking a current speed of the vehicle; calculating a recommended speed for passing over the speed bump based on the detailed information of the speed bump; comparing the current speed with the recommended speed; and generating a warning message if the current speed is above the recommended speed as a result of the comparison, to output the generated warning message.

The calculating of the recommended speed may include calculating the recommended speed for each of the one or more regions.

The method may further include: after the checking of the detailed information of the speed bump, determining whether the speed bump is a dummy speed bump; and generating, if the speed bump is a dummy speed bump, a message indicating that the speed bump is a dummy speed bump.

The method may further include, after the generating of the warning message, determining whether the vehicle has passed over the speed bump.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF EXEMPLARY EMBODIMENTS

Hereinafter, exemplary embodiments of the present disclosure will be described in more detail with reference to the accompanying drawings. A detailed description of features that are well known in the art or not directly related to the present disclosure will be omitted for purposes of brevity and to avoid obscuring a gist of the present disclosure.

Figure 1:
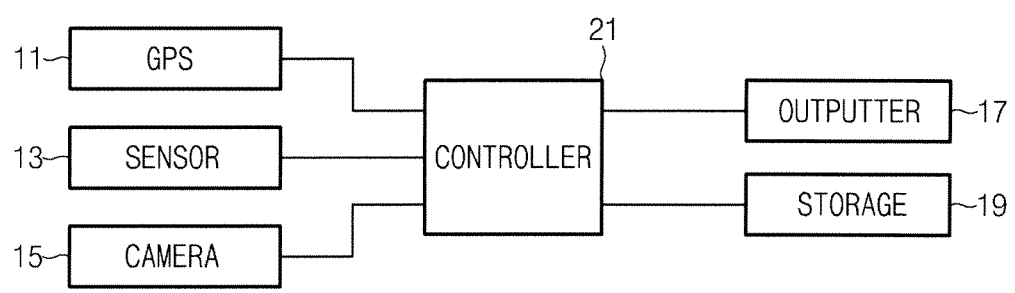
FIG. 1 is a block diagram showing major constituent elements of an apparatus for navigation control according to an exemplary embodiment of the present disclosure.
Figure 2:
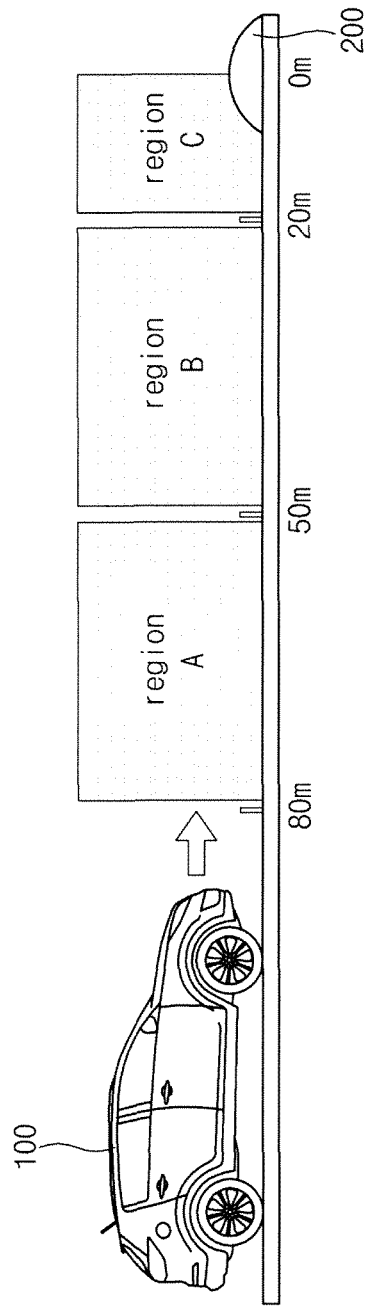
FIG. 2 is a diagram illustrating a method for warning about a speed bump according to an exemplary embodiment of the present disclosure.
Figure 3:
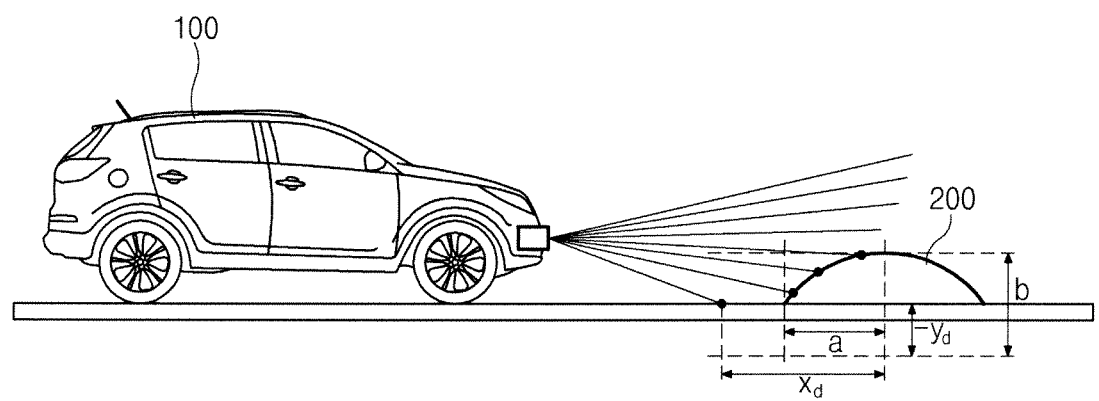
FIG. 3 is a diagram illustrating a method for recognizing a speed bump according to an exemplary embodiment of the present disclosure.

FIG. 1 is a block diagram showing major constituent elements of an apparatus for navigation control according to an exemplary embodiment of the present disclosure. FIG. 2 is a diagram illustrating a method for warning about a speed bump according to an embodiment of the present disclosure. FIG. 3 is a diagram illustrating a method for recognizing a speed bump according to an exemplary embodiment of the present disclosure.

Referring to FIGS. 1 to 3, an apparatus for navigation control 10 (hereinafter, "the apparatus") according to an exemplary embodiment of the present disclosure includes a global positioning system (GPS) 11, a sensor 13, a camera 15, an outputter 17, a storage 19 (e.g., a non-transitory computer-readable medium) and a controller 21 (e.g., a processor such as a computer, etc.).

The GPS 11 can be installed in a vehicle, and can be configured to convert an accurate location of the vehicle into coordinate values and to locate the position of a speed bump located ahead of the vehicle. The GPS 11 may locate the position of the speed bump by looking up map data stored in the storage 19 based on a current position of the vehicle acquired by a measurement signal of the GPS 11.

The sensor 13 may include a sensing element (not shown) installed at a front of the vehicle. The sensing element detects whether there is a speed bump in a traveling direction of the vehicle, and acquires detailed information on the speed bump. The sensing element included in the sensor 13 may be, for example, a laser radar which uses light detecting and ranging (LiDAR). However, the sensing element is not limited to a LiDAR, and various other sensing elements may also be used. Further, the sensor 13 may also include a speedometer to sense the speed of a vehicle in real-time or periodically.

The camera 15 may be installed at the front/rear of the vehicle to acquire image data of the current position of the vehicle.

The outputter 17 outputs the image data of the current position of the vehicle under control of the controller 21 and, if there is a speed bump in front of the current position, outputs a recommended speed for passing over the speed bump and the current speed of the vehicle via a display device (not shown) and/or a speaker (not shown).

The storage 19 stores the map data by communicating with a server (not shown) which provides map data, and stores the position of a speed bump together with the map data. Further, the storage 19 may store a program for calculating a recommended speed based on the detailed information of the speed bump, so that different recommended speeds can be provided to the driver for different speed bumps. In addition, the storage 19 may store vehicle information containing the type of vehicle, the weight of the vehicle, the length of the front bumper of the vehicle, and the like.

The controller 21 locates the current position of the vehicle and divides a distance from the current position to a speed bump into one or more regions. Further, the controller 21 acquires the current speed of the vehicle and calculates a recommended speed for passing over the speed bump based on the detailed information of the speed bump, so as to create a notification message if the current speed is faster than the recommended speed.

Specifically, the controller 21 locates the current position of the vehicle based on a signal received from the GPS 11. The controller 21 extracts map data corresponding to the current position from the storage 19, and marks the current position on the map data for outputting to the outputter 17. The controller 21 locates the position of the nearest speed bump from the current position. The controller 21 divides the distance from the current position to the speed bump into one or more regions. This will be described with reference to FIG. 2. The controller 21 locates the current position of the vehicle 100 based on a signal received from the GPS 11. If there is a speed bump 200 on the traveling path input to the apparatus 10 and located ahead in the traveling direction of the vehicle 100, the controller 21 divides the distance from, for example, a position 80 m away from the speed bump 200 to the speed bump 200 into three regions, for example, region A, region B and region C.

In the example shown in FIG. 2, region A extends from a position 80 m away from the speed bump 200 to a position 50 m away from the speed bump 200, region B extends from a position 50 m away from the speed bump 200 to a position 20 m away from the speed bump 200, and region C extends from a position 20 m away from the speed bump 200 to a position 0 m away from the speed bump 200. However, the present disclosure is not limited thereto and may be changed as necessary by those having ordinary skill in the art. When determining region C, the controller 21 may set the highest portion of the speed bump 200 as the position of 0 m as shown in FIG. 2.

In region A, the controller 21 recognizes a speed bump 200 located ahead of the vehicle 100 based on a signal received from the sensor 13, and refers to the detailed information on the speed bump 200. Based on the detailed information, the controller 21 determines whether the speed bump 200 ahead of the vehicle 100 is a dummy speed bump or an ordinary, circular speed bump (or any other shape for an actual speed bump). If it is determined that the speed bump 200 is a dummy speed bump, the controller 21 controls the outputter 17 to output a message indicating that the speed bump 200 is a dummy speed bump. In this example, a dummy speed bump may refer to, e.g., a picture of a speed bump painted on a road designed to encourage drivers to slow down.

If it is determined that the speed bump 200 ahead of the vehicle 100 is an ordinary, circular speed bump, the controller 21 calculates a recommended speed for passing over the speed bump 200 based on the current speed of the vehicle 100, the distance to the speed bump 200, and the detailed information of the speed bump 200. This operation is performed in each of regions A, B and C. This will be described with reference to FIG. 3.

The controller 21 uses a coordinate at a particular time instance as an absolute coordinate in order to calculate the height and width of the speed bump 200 detected by the sensing element of sensor 13. That is, when the vehicle 100 enters regions A, B and C, the sensing element may detect a plurality of points from the speed bump 200 to be used as an absolute coordinate. In addition, the controller 21 may calculate the height and width of the speed bump 200 using, e.g., the elliptical equation represented by Equation 1 below (other equations for other geometric shapes of different types of speed bumps can also be used as needed). The height H of the speed bump 200 is represented by Equation 2 and the width W of the speed bump 200 is represented by Equation 3.

$$1 = \frac{(x - x_d)^2}{a^2} + \frac{(y - y_d)^2}{b^2}$$ [Equation 1]

$$b - (-y_d)$$ [Equation 2]

$$x_d - a$$ [Equation 3]

The controller 21 calculates a recommended speed to safely pass over the detected speed bump 200. The standard specification of a speed bump is shown in Table 1 below.

TABLE 1

| | Type | Length/height | Speed limit |
| --- | --- | --- | --- |
| Standard road | Circular | 3.6 m/10 cm | 30 kph or less |
| Narrow road(among local roads) | Circular | 2.0 m/7.5 cm | 30 kph or less |
| Road in housing area | circular | 1.0 m/7.5 cm | 10 kpph or less |

A standard road and narrow road may be identified using the map data. Because the speed limit on the standard road and the narrow road is 30 kph, a parameter ω of the speed bump 200 to determine the recommended speed may be defined according to Equation 4.

$$\omega = \lambda \cdot \alpha^H \quad \text{[Equation 4]}$$

where $\lambda = H/L$, $\alpha = 1.634 \cdot 10^5$.

The values $\lambda$ for the roads are represented by Equations 5 to 7, respectively.

$$\lambda_{ref \cdot sta} = \frac{H}{L} = \frac{10 \text{ cm}}{3.6 \text{ m}} = 27.8 \cdot 10^{-3} \quad \text{[Equation 5]}$$

$$\lambda_{ref \cdot narrow} = \frac{H}{L} = \frac{7.5 \text{ cm}}{2.0 \text{ m}} = 37.5 \cdot 10^{-3} \quad \text{[Equation 6]}$$

$$\lambda_{ref \cdot sta} \cdot \alpha^{H_{ref \cdot sta}} = \lambda_{ref \cdot narrow} \cdot \alpha^{H_{ref \cdot narrow}} \quad \text{[Equation 7]}$$

Finally, because a recommended speed should be 30 kph when the value of the parameter $\omega$ is 0.0923 and 10 kph when the value of the parameter $\omega$ is 0.1845, the controller 21 defines a function $f(\omega)$ for calculating the recommended speed $v_{safety}$ as represented by Equation 8.

$$v_{safety} = f(\omega) = -216.92 \cdot \omega + 50.02 \quad \text{[Equation 8]}$$

where $\omega \leq 0.1845$.

The controller 21 locates the current position of the vehicle 100, senses the current speed of the vehicle 100 at the current position, and compares the calculated recommended speed in each of the regions A, B and C with the current speed.

If the current speed is below the recommended speed as a result of the comparison, the controller 21 provides the current speed and the recommended speed to the outputter 17 so as to output that the vehicle is traveling safely. If the current speed is above the recommended speed, the controller 21 outputs a warning message to the outputter 17 so that the driver can slow the vehicle down to the recommended speed.

Figure 4:
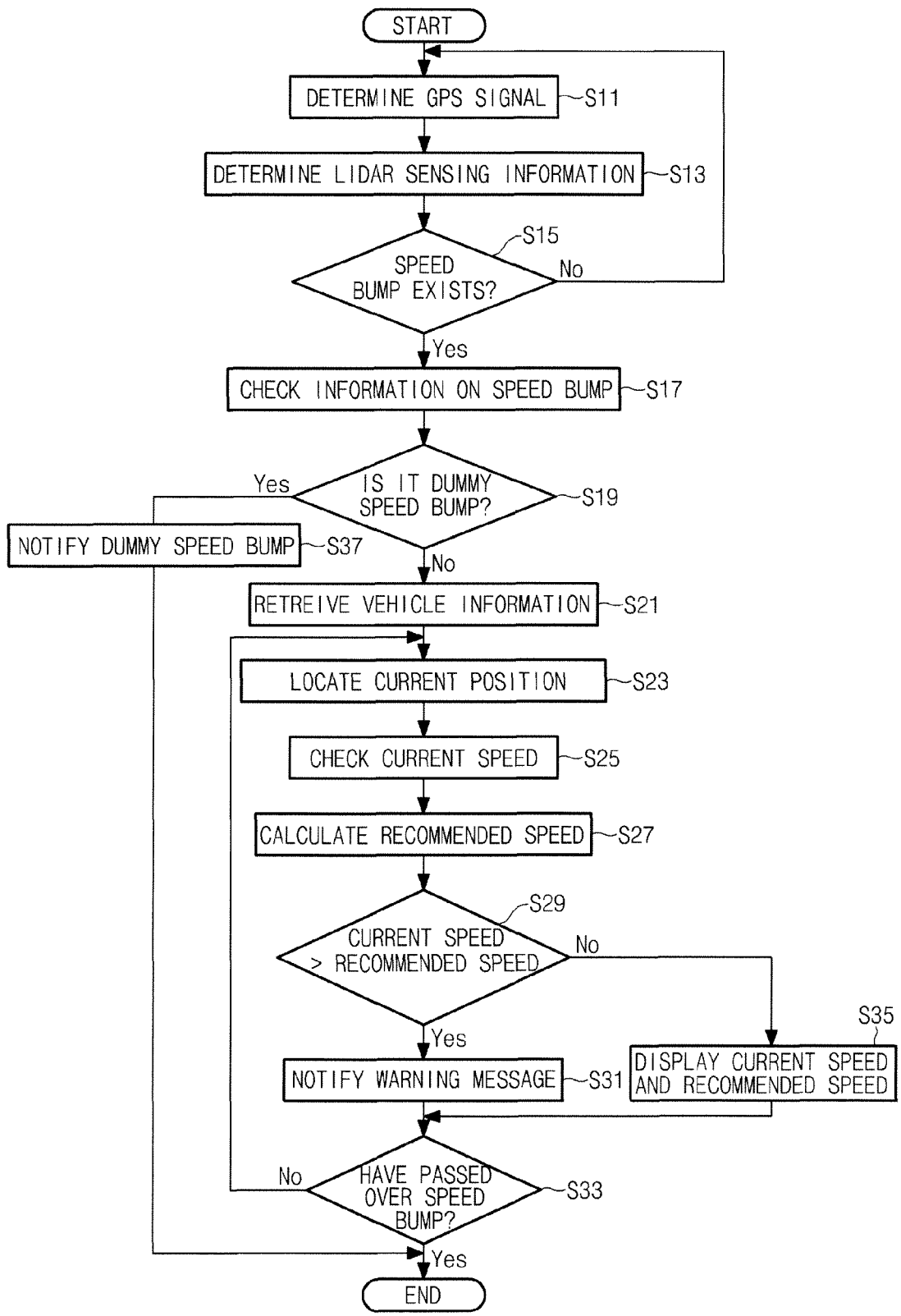
FIG. 4 is a flow chart illustrating a method for controlling a navigation device according to an exemplary embodiment of the present disclosure.

FIG. 4 is a flow chart illustrating a method for navigation control according to an exemplary embodiment of the present disclosure.

Referring to FIG. 4, in step S11, the controller 21 locates the current position of the vehicle based on a GPS signal received from the GPS 11.

In step S13, the controller 21 receives a signal from the, e.g., LiDAR sensor included in the sensor 13 and analyzes the signal.

In step S15, the controller 21 determines whether there is a speed bump ahead of the vehicle in the traveling direction from the current position, from the analysis result in step S13. As a result of the determination in step S15, the controller 21 proceeds to step S17 if there is a speed bump ahead of the vehicle. If there is no speed bump ahead of the vehicle, the controller 21 returns to step S11 and repeats the above steps again.

In step S17, the controller 21 analyzes the signal received from the LiDAR sensor in step S13 to obtain detailed information on the speed bump. The detailed information of the speed bump may include, e.g., the curvature, height, and width of the speed bump, etc.

In step S19, the controller 21 determines whether the speed bump detected in step S15 is a dummy or circular speed bump based on the detailed information of the speed bump obtained in step S17. If the speed bump detected in step S15 is a dummy speed bump as a result of the determination in step S19, the controller 21 proceeds to step S37 so as to output a message via the outputter 17 indicating that the speed bump ahead of the vehicle is a dummy speed bump.

If the speed bump detected in step S15 is a circular speed bump as a result of the determination in step S19, the controller 21 proceeds to step S21.

In step S21, the controller 21 retrieves vehicle information pre-stored in the storage 19. The vehicle information contains, e.g., the type and weight of the vehicle, and the like.

In step S23, the controller 21 locates the current position of the vehicle by receiving the current position from the GPS 11 in real-time (or periodically).

In step S25, the controller 21 checks the current speed of the vehicle using the data received from the speedometer included in the sensor 13.

In step S27, the controller 21 calculates a recommended speed for passing over the speed bump. Because this operation has been described above with respect to Equations 1 to 8, a detailed description thereon will not be made here.

In step S29, if it is determined that the current speed of the vehicle is above the recommended speed, the controller 21 proceeds to step S31 so as to output a warning message to notify the driver to slow down the vehicle to the recommended speed, and then proceeds to step S33. If the current speed of the vehicle is below the recommended speed, the controller 21 proceeds to step S35 to notify the driver that she or he is driving safely by outputting the current speed and the recommended speed to the outputter 17.

Subsequently, in step S33, the controller 21 determines whether the vehicle has passed over the speed bump. If the vehicle has passed over the speed bump as a result of the determination in step S33, the controller 21 ends the process and, e.g., provides a traveling guide to a selected destination or marks the path on which the vehicle is traveling on the map data so as to output to the outputter 17.

If the vehicle has not passed over the speed bump yet at step S33, the controller 21 proceeds returns to step S23 and repeats the above steps therefrom. As set forth above, according to an exemplary embodiment of the present disclosure, a driver can be provided with a recommended speed from a time at which the vehicle is located at a predetermined position away from a speed bump until the vehicle passes over the speed bump. Accordingly, the driver can slow down gradually so that damage to the vehicle or injury of a passenger, which may occur when the vehicle passes over the speed bump, can be prevented.

As set forth above, according to exemplary embodiments of the present disclosure, a driver can be notified of the presence of a speed bump along with a safe speed to drive over the speed bump, such that damages to a vehicle and injuries of a passenger can be minimized.

An apparatus and method for navigation control according to exemplary embodiments of the present disclosure have been described in the detailed description and the accompanying drawings. Although specific terms have been used, such terms are merely used for the purpose of easily describing the present disclosure, but are not used for limiting the scope of the present disclosure. Various modifications may be made without departing from the scope of the present disclosure, other than the exemplary embodiments described herein.

What is claimed is:

1. An apparatus for navigation control, the apparatus comprising:
 a GPS configured to locate a current position of a vehicle and a speed bump ahead of the vehicle;
 a sensor configured to acquire detailed information of the speed bump and a current speed of the vehicle;
 a controller configured to calculate a height and width of the speed bump based on the detailed information, to locate the current position of the vehicle to divide a distance from the current position to the speed bump into plural regions, to check the current speed of the vehicle, to calculate a recommended speed for passing over the speed bump based on the detailed information of the speed bump, and to generate a warning message if the current speed is above the recommended speed; and an outputter configured to output the warning message under control of the controller.

2. The apparatus according to claim 1, wherein the controller calculates the recommended speed for each of the plural regions.

3. The apparatus according to claim 2, wherein the controller determines whether the speed bump is a dummy speed bump by checking the detailed information of the speed bump.

4. The apparatus according to claim 3, wherein the controller, if the speed bump is a dummy speed bump, generates a message to indicate that the speed bump is a dummy speed bump and provides the message to the outputter.

5. The apparatus according to claim 1, wherein the sensor checks the detailed information containing a curvature, the height, and the width of the speed bump, to provide the controller with the detailed information.

6. The apparatus according to claim 1, wherein the controller checks information of the vehicle containing a type and weight of the vehicle.

7. The apparatus according to claim 1, wherein the controller calculates the height and width using an elliptical equation.

8. A method for navigation control, the method comprising:

locating, by a controller, a speed bump ahead of a vehicle based on a signal received from a GPS;

checking detailed information of the speed bump based on a signal received from a sensor;

calculating, by the controller, a height and width of the speed bump based on the detailed information;

locating a current position of the vehicle to divide a distance from the current position to the speed bump into plural regions;

checking a current speed of the vehicle;

calculating a recommended speed for passing over the speed bump based on the detailed information of the speed bump;

comparing the current speed with the recommended speed; and generating a warning message if the current speed is above the recommended speed as a result of the comparison, to output the generated warning message.

9. The method according to claim 8, wherein the calculating of the recommended speed includes calculating the recommended speed for each of the plural regions.

10. The method according to claim 9, further comprising:

after the checking of the detailed information of the speed bump, determining whether the speed bump is a dummy speed bump; and generating, if the speed bump is a dummy speed bump, a message indicating that the speed bump is a dummy speed bump, to output the generated message.

11. The method according to claim 9, further comprising, after the generating of the warning message, determining whether the vehicle has passed over the speed bump.

12. The method according to claim 8, wherein the controller calculates the height and width using an elliptical equation.

* * * * *